US 11,823,706 B1

(12) United States Patent
Yang et al.

(10) Patent No.: US 11,823,706 B1
(45) Date of Patent: Nov. 21, 2023

(54) VOICE ACTIVITY DETECTION IN AUDIO SIGNAL

(71) Applicant: Meta Platforms, Inc., Menlo Park, CA (US)

(72) Inventors: Jun Yang, San Jose, CA (US); Joshua Bingham, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 160 days.

(21) Appl. No.: 16/601,484

(22) Filed: Oct. 14, 2019

(51) Int. Cl.
| G10L 25/84 | (2013.01) |
| G10L 15/02 | (2006.01) |
| G10L 15/22 | (2006.01) |
| G10L 25/18 | (2013.01) |
| G10L 21/0232 | (2013.01) |

(52) U.S. Cl.
CPC .............. *G10L 25/84* (2013.01); *G10L 15/02* (2013.01); *G10L 15/22* (2013.01); *G10L 21/0232* (2013.01); *G10L 25/18* (2013.01)

(58) Field of Classification Search
CPC ......... G10L 25/84; G10L 15/02; G10L 15/22; G10L 15/0232; G10L 25/18
USPC ........................................................ 704/233
See application file for complete search history.

(56) References Cited

U.S. PATENT DOCUMENTS

| 8,175,871 | B2* | 5/2012 | Wang | H04M 9/082 |
| | | | | 379/406.01 |
| 9,171,552 | B1* | 10/2015 | Yang | G10L 25/84 |
| 10,134,425 | B1* | 11/2018 | Johnson, Jr. | G10L 15/05 |
| 2011/0246185 | A1* | 10/2011 | Arakawa | G10L 25/78 |
| | | | | 704/200 |
| 2015/0032446 | A1* | 1/2015 | Dickins | G10L 25/84 |
| | | | | 704/233 |
| 2016/0093313 | A1* | 3/2016 | Vickers | G10L 25/78 |
| | | | | 704/232 |
| 2016/0203833 | A1* | 7/2016 | Zhu | G10L 25/48 |
| | | | | 704/233 |
| 2016/0267924 | A1* | 9/2016 | Terao | G10L 25/51 |
| 2016/0275968 | A1* | 9/2016 | Terao | G10L 25/84 |
| 2018/0286422 | A1* | 10/2018 | Liang | G10L 21/0364 |

\* cited by examiner

*Primary Examiner* — Richemond Dorvil
*Assistant Examiner* — Rodrigo A Chavez
(74) *Attorney, Agent, or Firm* — Fenwick & West LLP

(57) ABSTRACT

A method of detecting human voice activity includes determining a presence of human voice in a frame of audio signal using a plurality of features extracted from the frame of audio signal. The extracted features can include a number of zero-crossings, a periodicity metric, an energy ratio between a low frequency band and a high frequency band, and an envelope-to-floor ratio (EFR) in the frame of audio signal. Each of the features is associated with predefined criteria indicative of a presence of human voice, and based on comparisons of the features to the respective predefined criteria, the voice activity detector determines whether the frame of audio signal includes a human voice.

20 Claims, 5 Drawing Sheets

US 11,823,706 B1

VOICE ACTIVITY DETECTION IN AUDIO SIGNAL

BACKGROUND

This disclosure relates generally to detecting voice activity, and more specifically to extracting features from audio signal and detecting presence of human voice based on comparison of the extracted features to predefined criteria indicative of human voice.

With growing popularity of voice controlled devices and voice communication devices (e.g., smart phones, smart home devices), accurate detection of voice activity is an important application for receiving user input for these devices. Typically, a voice activated device includes one or more microphones for receiving audio signals from its environment and analyzing the received audio signals to determine presence of a user's voice. However, conventional methods for voice detection either require complex algorithms that are expensive to implement or sacrifice accuracy to keep costs low for the devices.

SUMMARY

Embodiments relate to detecting voice activity in a frame of audio signal based on a plurality of features extracted from the audio signal. The audio signal representing sound from an environment surrounding a client device is applied with a plurality of feature extraction algorithms to determine a plurality of features of the audio signal. The plurality of features are compared to respective predefined criteria, where the respective predefined criteria are indicative of a presence of a human voice in the audio signal. For each feature, an output is generated based on the comparison of the feature to its associated predefined criteria. The outputs of the plurality of features is then used to determine an aggregate value for the frame of audio signal. Based on the aggregate value, presence of a human voice in the frame of audio signal is determined for the frame, and a voice detection signal indicative of the presence of a human voice is generated and output.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
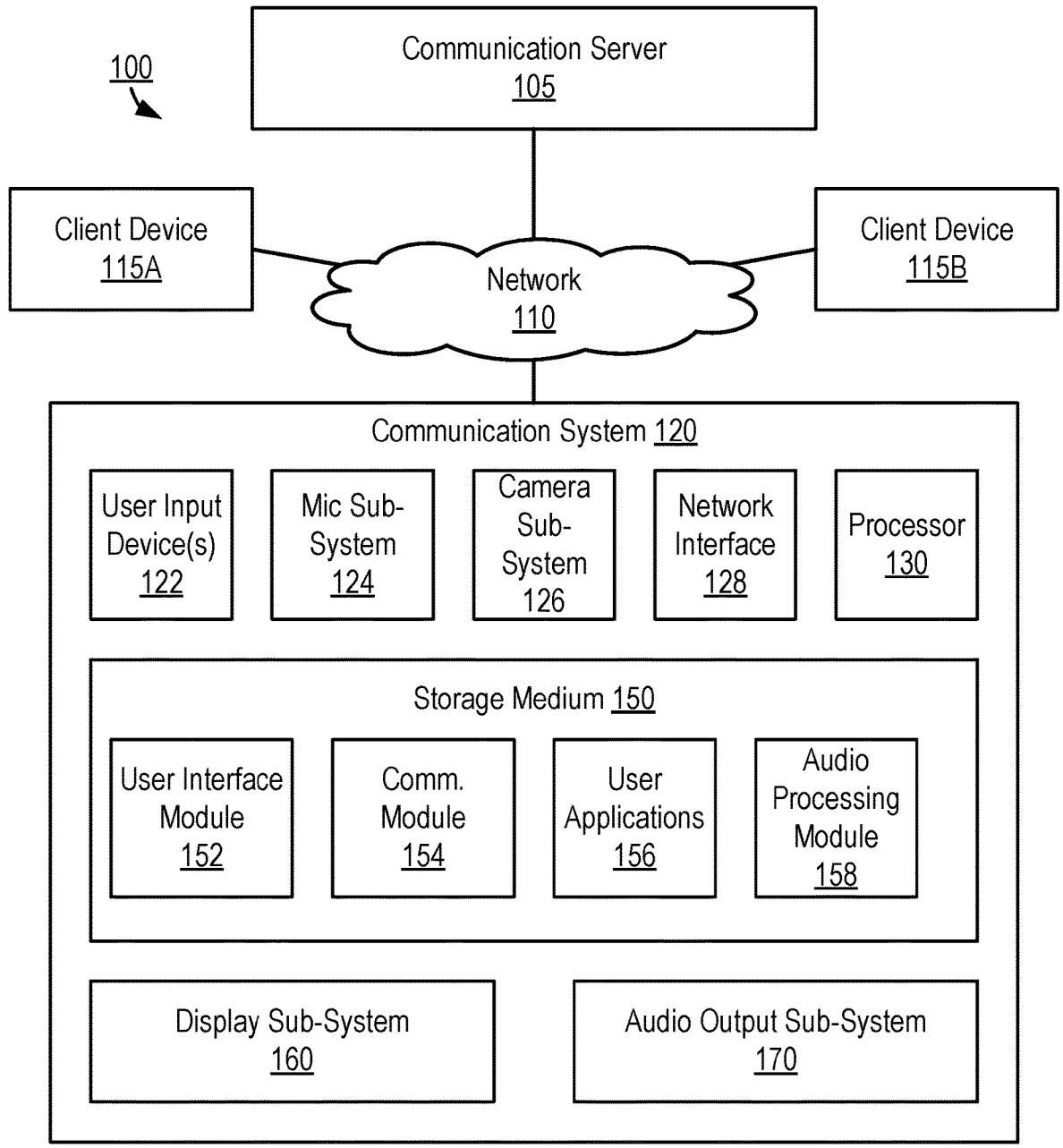
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The mic sub-system 124 may collect audio signal representing sound in an environment surrounding the communication system 120 at a constant sampling rate that is greater than or equal to 8 kHz. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 128 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 160 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 170 may output audio in multiple channels to generate beamformed audio signals that give the listener a sense of directionality associated with the audio. For example, the audio output subsystem 170 may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, audio processing module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications 156, and audio processing module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The audio processing module 158 dynamically performs audio processing on an audio signal to determine a presence of a human voice in each frame of the audio signal. In some embodiments, the audio processing module 158 may receive audio signals from the mic sub-system 124. The audio processing module 158 receives a frame of audio signal from the mic sub-system 124 to be analyzed for presence of a human voice, where each frame of audio signal has a duration of at least 4 ms. For each frame of audio signal, the audio processing module 158 performs voice detection to determine presence of a human voice in the frame of audio signal. The audio processing module 158 may determine characteristics of the audio signal by applying feature extraction algorithms to extract features from the audio signal and comparing each of the extracted features to corresponding predefined criteria indicative of human voice. Based on the comparison of each of the extracted features to its corresponding predefined criteria, the audio processing module 158 determines whether the feature is indicative of human voice. For example, the audio processing module 158 determines an aggregate value that represents an overall result of the feature comparisons of the individual features. The aggregate value is compared to a threshold, and if the aggregate value is greater than the threshold, the audio processing module 158 determines that there is a human voice in the audio signal. Based on the presence determination, the audio processing module 158 generates a voice detection signal indicative of the presence of a human voice in the frame of audio signal. The voice detection signal may be transmitted to the client device 115 or to the communication server 105 via the network 110.

Figure 2:
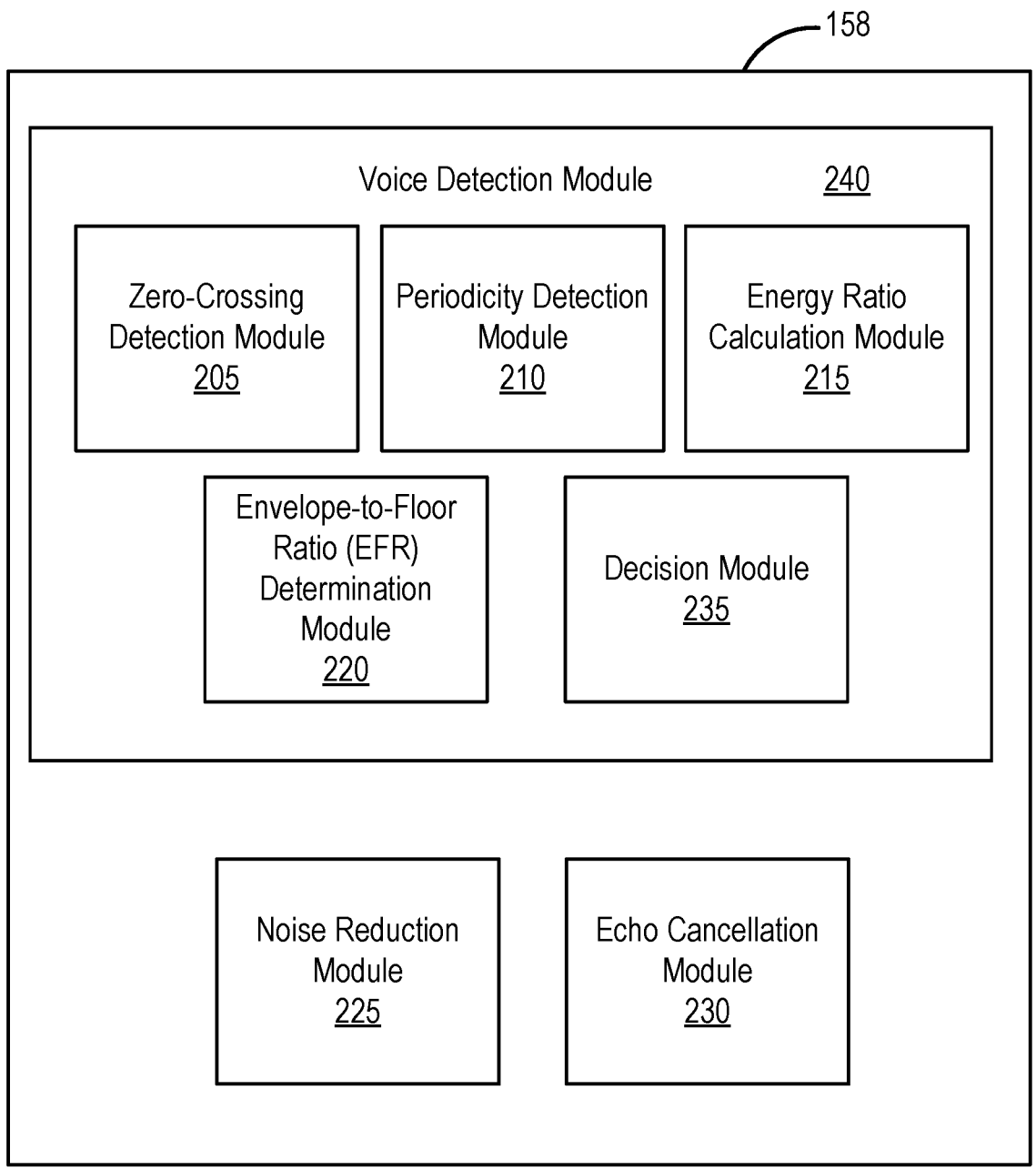
FIG. 2 is a block diagram of a voice detection module, in accordance with an embodiment.

FIG. 2 is a block diagram of a audio processing module 158, in accordance with an embodiment. The audio processing module 158 includes a voice detection module 240, a noise reduction module 225, and an echo cancellation module 230. The voice detection module 240 includes a zero-crossing detection module 205, a periodicity detection module 210, an energy ratio calculation module 215, an envelope-to-floor (EFR) determination 220, and a decision module 235. In alternative configurations, different and/or additional components may be included in the audio processing module 158. For example, the audio processing module 158 may include additional modules for different and/or additional features used to detect a human voice.

In some embodiments, to improve accuracy of voice detection and to reduce sensitivity to the predefined criteria, the received audio signal may be pre-processed by the noise reduction module 225 and/or the echo cancellation module 230 prior to being analyzed by the voice detection module 240. The audio signal may include background noise in addition to a human voice, and to better isolate features from the human voice, the noise reduction module 225 may estimate noise signals and remove the noise signals from the audio signal. To further improve the quality of the audio signal, the echo cancellation module 230 may remove effects of echo in the audio signal. The refined audio signal generated by the noise reduction module 225 and/or the echo cancellation module 230 may then be used by the feature extraction modules in the voice detection module 240 (e.g., zero-crossing detection module 205, periodicity detection module 210, the energy ratio calculation module 215, and the EFR determination 220).

In some embodiments, each of the feature extraction modules extracts a different feature and compares the feature to predefined criteria, where the predefined criteria is a threshold indicative of a human voice for the particular feature. The thresholds used by the feature extraction modules may be determined using a machine learning model (not shown in the figures). In some embodiments, the machine learning model may be stored in the storage medium 150 of the communication system 120. In other embodiments, the machine learning model may be stored outside of the communication system 120 (e.g., in the communication server 105), and thresholds for the features determined by the machine learning model may be provided to the communication system 120 to be used by the audio processing module 158. During the training phase, the machine learning model may receive a training dataset for each of the different features. The training data sets are selected based on the intended application of the voice detection.

The zero-crossing detection module 205 determines a number of zero-crossing points in a frame of audio signal and compares the number to a threshold value to generate a detection result. In general, the human voice has fewer zero-crossing points compared to environmental noises. The determined number of zero-crossing points in the frame of audio signal can be compared to the threshold value to determine whether the number of zero-crossing points is indicative of a presence of a human voice in the frame. If the number of zero-crossing points in the frame is lower than the threshold number, the zero-crossing detection module 205 determines that the frame of audio signal is indicative of a presence of a human voice and vice versa.

To reduce the effect of the noise on the zero-crossing point count for the frame, a zero-crossing rate (ZCR) is calculated by determining a ratio of the number of zero-crossing points to the frame length, and the ZCR is applied with a smoothing function to generate a smoothed ZCR. The zero-crossing detection module 205 determines the number of zero-crossing points by counting a number of times that the audio signal either changes from a negative value to a positive value or changes from a positive value to a negative value. Based on the comparison of the smoothed ZCR with a threshold, the zero-crossing detection module 205 generates an output and sends the output to the decision module 235.

If the smoothed ZCR is less than the threshold value, the zero-crossing detection module 205 generates a signal indicative of voice presence.

The periodicity detection module 210 determines a periodicity metric of the frame of audio signal. In an embodiment, the periodicity detection module 210 performs an autocorrelation to compare the frame of audio signal with its time shifted versions to determine whether the frame of the audio signal is similar to the time shifted versions. The periodicity metric exceeding a threshold value is indicative of presence of a human voice. Details on the algorithm used by the periodicity detection module 210 is discussed with respect to FIGS. 3A and 3B.

Figure 3A:
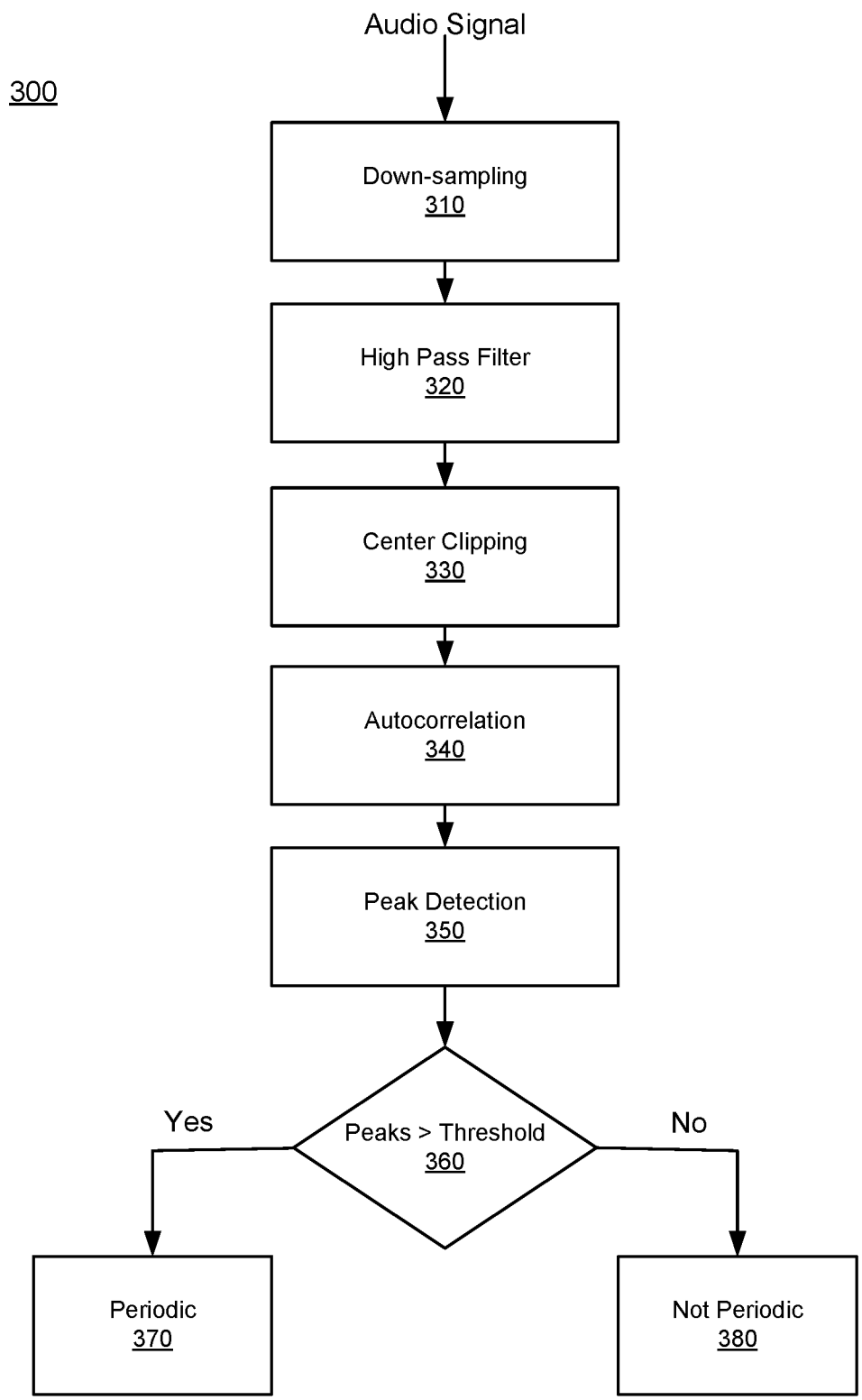
FIG. 3A is a flow chart illustrating a periodicity detection process, in accordance with an embodiment.

FIG. 3A is a flow chart illustrating a periodicity detection process 300, in accordance with an embodiment. In alternative processes, different and/or additional steps may be included. The periodicity detection module 210 receives a frame of audio signal. The received audio signal is down-sampled 310 to reduce the number of data samples to be analyzed in subsequent steps of the periodicity detection process 300, which reduces the computational complexity. For example, the received audio signal may be sampled at 16 kHz. The received audio signal at 16 kHz may be down-sampled to 4 kHz by the periodicity detection module 210 resulting in a data size that is a quarter of the original received audio signal.

The down-sampled audio signal is passed through a high pass filter 320 that blocks signals below a cutoff frequency and passes signals above the cutoff frequency. The high pass filter 320 removes environmental noise that lies in a frequency range that is lower than the range of human voice. For example, since the range of human voice typically lies between 80 Hz to 14 kHz, the cutoff frequency of the high pass filter may be set to around 60 Hz such that the noise below 60 Hz is removed and signals greater than or equal to 60 Hz are allowed to pass.

Figure 3B:
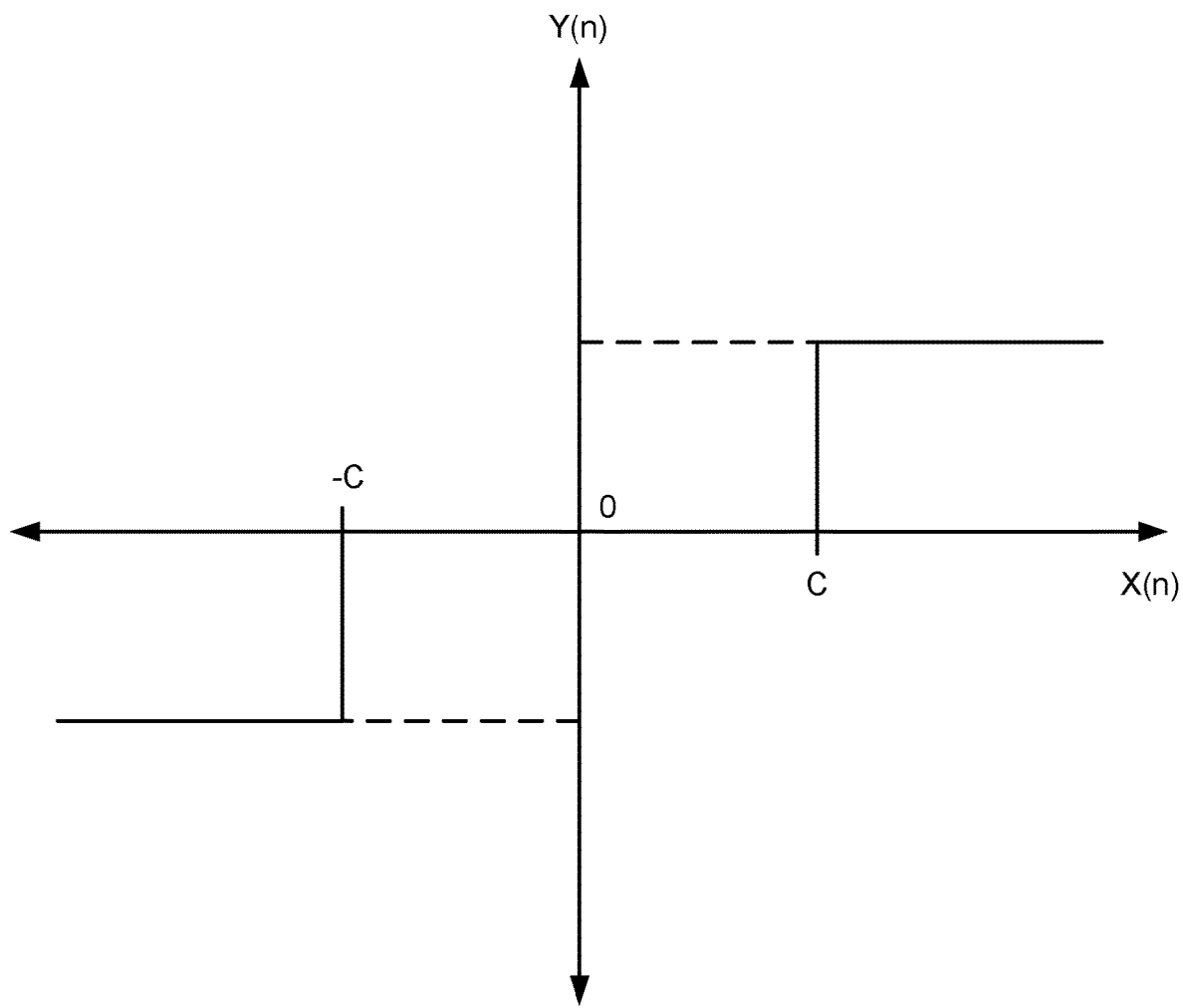
FIG. 3B illustrates a relationship between an input signal and an output signal of a center clipping algorithm used in the periodicity detection process of FIG. 3A, in accordance with an embodiment.

After being down-sampled 310 and passed through the high pass filter 320, the audio signal is applied with a center clipping algorithm 330. FIG. 3B illustrates a relationship between an input signal X(n) and an output signal Y(n) of a center clipping algorithm 330 used in the periodicity detection process of FIG. 3A, in accordance with an embodiment. In FIG. 3B, the input signal X(n) represents the audio signal after being down-sampled 310 and passed through the high pass filter 320. The output signal Y(n) represents the audio signal after being applied with the center clipping algorithm 330.

As shown in FIG. 3B, when the instantaneous amplitude of the input signal X(n) is less than a negative cutoff value of −C, the input signal X(n) is clipped to a value of −1 to generate the output signal Y(n). When the amplitude of the input signal X(n) is greater than the positive cut off value of C, the input signal X(n) is clipped to a value of 1 to generate the output signal Y(n). When the amplitude of the input signal X(n) is between the negative cut off value and the positive cut off value, the output signal Y(n) is set to 0. The cutoff value C represents an estimate of an amplitude of the audio signal under normal conditions without effects of abnormal environmental noises. A common problem with typical voice detection methods is that loud noises are inaccurately identified as voices. The center clipping algorithm 330 improves robustness in autocorrelation 340 that is performed subsequent to the center clipping algorithm 330 by suppressing effects of environmental noises on the audio signal to improve results of the autocorrelation 340. To determine C, a frame of audio signal is divided into a plurality of sub-frames, and a local peak in amplitude of the audio signal is determined for each of the sub-frames. In one example, the frame of audio signal is divided into three sub-frames, and three local peaks are extracted from the three sub-frames. Amplitudes of the three local peaks are compared with each other, and a smallest peak among the local peaks are selected as the cutoff value.

The audio signal applied with center clipping 330 is provided as an input signal for performing the autocorrelation 340. The autocorrelation 340 involves comparing the input signal to a plurality of time shifted versions of the input signal, where the plurality of time shifted versions are the input signal that is shifted by different time delays. The autocorrelation 340 determines an output signal as a function of time delay that represents the relationship between the input audio signal and shifted versions of the input audio signal at different time delay values. The periodicity detection module 210 detects 350 a peak in the output signal resulting from the autocorrelation 340. The peak is compared 360 to a predefined threshold value, and if the peak is greater than the threshold value, the audio signal is determined to be periodic 370. If the peak is less than the threshold value, the audio signal is determined to be not periodic 380. The periodicity detection module 210 generates an output that indicates whether the frame of audio signal is periodic or not and sends the output to the decision module 235.

Returning to FIG. 2, the energy ratio calculation module 215 determines an energy ratio in the frame of audio signal between an energy in low frequency bands and an energy in high frequency bands. The human voice has more energy in the low frequency band compared to the high frequency band, and if the determined energy ratio (e.g., energy in the low frequency band divided by energy in the high frequency band) is greater than a predefined threshold, the energy ratio is indicative of a presence of a human voice. For robustness, the energy ratio is smoothed, and the smoothed energy ratio is compared with a second predefined threshold. If the smoothed energy ratio is larger than a second predefined threshold, it is an indicator of a presence of a human voice.

In some embodiments, the low frequency band may be defined as frequencies below a cut off frequency (e.g., 3 kHz) and the high frequency band may be defined as frequencies above the cut off frequency. The audio signal may be divided into the low frequency band and the high frequency band by applying a filter in the time domain. For example, a high pass filter with a cut off frequency at 3 kHz can be applied to the received audio signal to extract signals in the high frequency band. After the audio signal is divided into the low frequency band and the high frequency band, the energy of the low frequency band and the energy of the high frequency band are determined. The energy ratio calculation module 215 determines the energy ratio by dividing the low frequency band energy by the high frequency band energy. If the computed energy ratio is greater than a predefined threshold, the energy ratio is indicative of a human voice. The energy ratio calculation module 215 generates an output based on the comparison to the threshold and send the output to the decision module 235. For robustness, the energy ratio is smoothed, then the smoothed energy ratio is compared with a second predefined threshold. If the smoothed energy ratio is larger than a second predefined threshold, it is an indicator of a presence of a human voice.

The envelope-to-floor (EFR) determination module 220 determines an envelope-to-floor ratio (EFR) in the frame of audio signal to estimate a signal-to-noise relationship in the frame. The EFR determination module 220 applies a slow-attack fast-release filter on the audio signal to estimate floor of the audio signal and applies a fast-attack slow-release filter to estimate envelope of the audio signal.

In some embodiments, the fast-attack slow-release filter is associated with a fast attack time (e.g., 5.0 ms) and slow release time (e.g., 50 ms). The slow-attack fast-release filter is associated with a slow attack time (e.g., 1.0 s) and a fast release time (e.g., 100.0 ms). The attack time and release time parameters may vary. The input and output relationship of the filters are shown in Equation 1:

$$w(n)=w(n-1)+\alpha*(v(n)-w(n-1)) \qquad \text{<Equation 1>}$$

In Equation 1, the input audio signal is v(n), the output audio signal of the filter is w(n), and n is a time variable. When the input audio signal v(n) is greater than a previous output audio signal w(n−1), a scaling factor α represents an attack time constant. When the input audio signal v(n) is less than the previous output audio signal w(n−1), the scaling factor α represents a release time constant.

The EFR determination module 220 applies the slow-attack fast-release filter to the input signal to generate a floor estimate and applies the fast-attack slow-release filter to the input signal to generate an envelope estimate. Once the envelope estimate and the floor estimate of the audio signal are generated, the EFR between the envelope and the floor is determined. The EFR is smoothed and compared to a predefined threshold. If the EFR is greater than the predefined threshold, the EFR is indicative of a human voice. The EFR determination module 220 generates an output based on the comparison to the threshold and sends the output to the decision module 235.

The decision module 235 receives outputs from the zero-crossing detection module 205, periodicity detection module 210, energy ratio calculation module 215, and EFR determination module 220 to decide whether there is a human voice present in the audio signal. Each of the feature extraction modules may generate an output representing one or more characteristics indicative of a presence of a human voice in the frame of audio signal and provide the output to the decision module 235. In some embodiments, each of the modules may send a binary output for a given frame of audio signal. For example, an output of "1" may indicate that a feature corresponding to the module is indicative of human voice while an output of "0" indicates that the feature is not indicative of human voice. The decision module 235 compiles the outputs to determine an aggregate value, and determines whether the features indicate that the frame includes a human voice. To determine the aggregate value, the decision module 235 may add the outputs compare the sum to a decision threshold value. For example, in the example shown in FIG. 2, there are four features being extracted. The decision module 235 may determine that when at least two of the four features are indicative of human voice, there is a human voice (i.e., when the sum of the outputs is at least two). The decision module 235 may also compare to a different threshold number.

In some embodiments, the decision module 235 may assign a weight to each of the features and apply the weights to the received outputs from the plurality of feature extraction modules for the aggregate value. The weights may be equal across all the features or may be different. The weights may be determined based on an accuracy of the predefined criteria used in the respective module. For example, if the zero-crossing detection module 205 is compared to a more finely tuned threshold value compared to the periodicity detection module 210, the output from the zero-crossing detection module 205 may have greater weight in the sum determined by the decision module 235. When the sum of the outputs is greater than the decision threshold value, the decision module 235 determines that there is a human voice in the frame of audio signal. Once the decision module 235 makes a decision, the decision module 235 outputs a voice detection signal indicative of the presence of a human voice in the frame of audio signal.

Figure 4:
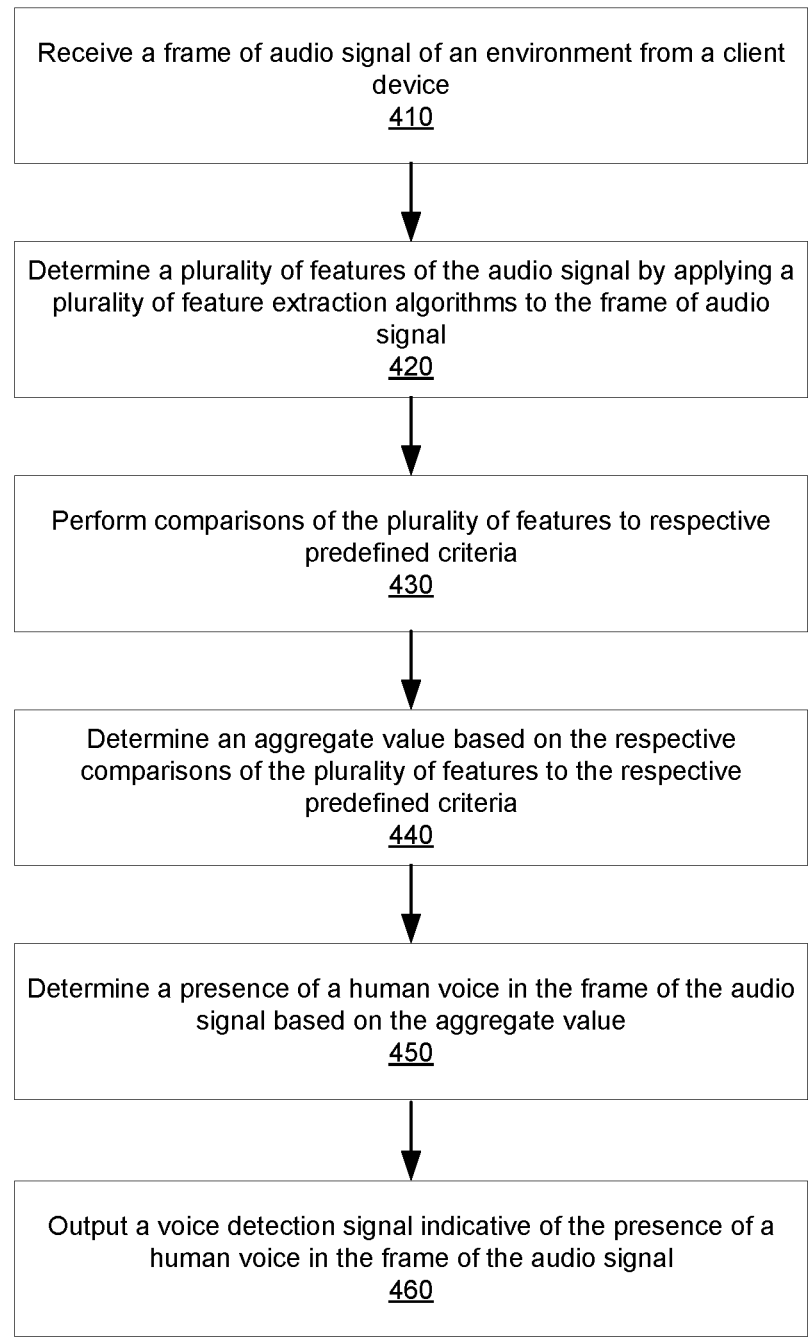
FIG. 4 is a flow chart illustrating a process for detecting voice activity, in accordance with an embodiment.

FIG. 4 is a flow chart illustrating a process 400 for detecting voice activity, in accordance with an embodiment. The process 400 may include different or additional steps than those described in conjunction with FIG. 4 or in different orders than the order described in conjunction with FIG. 4.

The voice activity detection module receives 410 a frame of audio signal of an environment from a client device. The frame of audio signal represents sound present in the environment during a particular duration of time. The sound may include a human voice in addition to environmental noises, and the voice activity detection module analyzes the audio signal to determine presence of a human voice in the audio signal.

The voice activity detection module determines 420 a plurality of features of the audio signal by applying a plurality of feature extraction algorithms to the frame of audio data. In some embodiments, the plurality of features may include zero-crossings, periodicity, energy ratio between a low frequency band and a high frequency band, and an envelope-to-floor-ratio.

The voice activity detection module performs 430 comparisons of the plurality of features to respective predefined criteria. For each of the plurality of features, the voice activity detection module compares the extracted feature to its corresponding predefined criteria. Based on the comparison, the voice activity detection module determines an output for each feature that is indicative of a presence of a human voice.

The voice activity detection module determines 440 an aggregate value based on the respective comparisons of the plurality of features to the respective predefined criteria. The outputs based on the plurality of features are combined and represented in the aggregate value.

The voice activity detection module determines 450 a presence of a human voice in the frame of the audio signal based on the aggregate value. The aggregate value may be compared to a threshold decision value. If the aggregate value is greater than the threshold decision value, the voice activity detection module determines that the audio signal includes a human voice, and if the aggregate value is less than the threshold decision value, the voice activity detection module determines that the audio signal does not include a human voice.

The voice activity detection module outputs 460 a voice detection signal indicative of the presence of a human voice in the frame of the audio signal.

The voice activity detection module may be implemented in any device that processes audio data such as a voice control device or a voice communication device. Voice activity detection is a useful application in noise cancellation because it can be used to establish a baseline background noise signal to remove from an audio signal. For example, the voice activity detection module may detect when there is no voice presence and capture an audio signal of the environment with no voice presence to be used as an estimate for background noise. The captured audio signal can then be used by a voice communication device to reduce noise level in the audio signal during a call. Voice activity detection can also be used for echo cancellation by determining when a user has stopped speaking as a signal to start searching for an echo in the audio signal and to remove the echo.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a frame of audio signal of an environment from a client device;
selecting a training data set based on an application of one or more voice detection applications;
determining, using a machine learning model trained using the training data set, a threshold of predefined criteria associated with an algorithm of a plurality of algorithms for determining a presence of a human voice in the frame of audio signal, each of the plurality of algorithms configured to output a feature of the audio signal;
dividing the frame of audio signal into a plurality of sub-frames;
for each of the plurality of sub-frames, determining a local peak in amplitude;
determining a minimum local peak among the plurality of local peaks in amplitude;
generating a filtered signal using the frame of the audio signal;
performing a center clipping on the filtered signal using the minimum local peak as a cut off value;
performing an autocorrelation of the center-clipped filtered signal to generate an autocorrelation signal;
detecting a periodicity metric of the frame of audio signal using the autocorrelation signal, wherein the periodicity metric is a first feature of the audio signal;
determining a result for each of the plurality of algorithms, the result for the algorithm having a first value in response to the feature output by the algorithm indicating the human voice based on a comparison of the feature output to predefined criteria associated with the algorithm indicating the feature output is indicative of the human voice and having a second value in response to the comparison of the feature output to the predefined criteria associated with the algorithm indicating the feature output is not indicative of the human voice;
determining the presence of the human voice in the frame of audio signal responsive to an aggregation of the results determined for each of the plurality of algorithms indicating the human voice exceeding a decision threshold value, wherein the aggregation is computed by applying a weight to each result determined for each of the plurality of algorithms; and
outputting a voice detection signal indicative of the presence of the human voice in the frame of audio signal.

2. The method of claim 1, further comprising:
performing a smoothing function on the frame of audio signal to reduce noise to generate smoothed audio signal; and
determining a number of zero-crossings in the smoothed audio signal, the zero-crossings comprising changes in the audio signal from a negative value to a positive value or from a positive value to a negative value,
wherein the number of zero-crossings is indicative of the human voice if the number of zero-crossings is less than a threshold number of zero-crossings, and wherein the number of zero-crossings is a second feature of the audio signal.

3. The method of claim 1,
wherein the periodicity metric is indicative of the human voice if the periodicity metric exceeds a threshold periodicity metric.

4. The method of claim 1, further comprising:
determining a peak amplitude of the autocorrelation signal.

5. The method of claim 1, wherein generating the filtered signal using the frame of the audio signal comprises:
performing a down-sampling of the frame of audio signal to generate a down-sampled frame; and
applying a high pass filter to the down-sampled frame of audio signal to generate a filtered signal, the high pass filter configured to remove signals with a frequency lower than a predefined threshold frequency.

6. The method of claim 1, further comprising:
identifying a low frequency band and a high frequency band in the frame of audio signal;
computing an energy of the low frequency band and an energy of the high frequency band; and
determining an energy ratio of the energy of the low frequency band and the energy of the high frequency band to generate an energy ratio,
wherein the energy ratio is indicative of the human voice if the energy ratio is greater than a threshold energy ratio, and wherein the energy ratio is a second feature of the audio signal.

7. The method of claim 1, further comprising:
determining an audio envelope estimate by applying a first filter to the frame of audio signal;
determining an audio floor estimate by applying a second filter to the frame of audio signal; and
determining an envelope-to-floor ratio of the determined audio envelop estimate to the determined audio floor estimate,
wherein the envelope-to-floor ratio is indicative of the human voice if the envelope-to-floor ratio is greater than a threshold envelop-to-floor ratio, and wherein the envelope-to-floor ratio is a second feature of the audio signal.

8. The method of claim 7, wherein the first filter comprises a fast-attack and slow-release filter.

9. The method of claim 7, wherein the second filter comprises a slow-attack and fast-release filter.

10. The method of claim 1, wherein the one or more voice detection applications includes noise cancelation or echo cancelation.

11. A non-transitory computer-readable medium comprising computer program instructions that when executed by a computer processor of an online system cause the computer processor to perform steps comprising:
receiving a frame of audio signal of an environment from a client device;
selecting a training data set based on an application of one or more voice detection applications;
determining, using a machine learning model trained using the training data set, a threshold of predefined criteria associated with an algorithm of a plurality of algorithms for determining a presence of a human voice in the frame of audio signal, each of the plurality of algorithms configured to output a feature of the audio signal;
dividing the frame of audio signal into a plurality of sub-frames;
for each of the plurality of sub-frames, determining a local peak in amplitude;
determining a minimum local peak among the plurality of local peaks in amplitude;
generating a filtered signal using the frame of the audio signal;

performing a center clipping on the filtered signal using the minimum local peak as a cut off value;

performing an autocorrelation of the center-clipped filtered signal to generate an autocorrelation signal;

detecting a periodicity metric of the frame of audio signal using the autocorrelation signal, wherein the periodicity metric is a first feature of the audio signal;

determining a result for each of the plurality of algorithms, the result for the algorithm having a first value in response to the feature output by the algorithm indicating the human voice based on a comparison of the feature output to predefined criteria associated with the algorithm indicating the feature output is indicative of the human voice and having a second value in response to the comparison of the feature output to the predefined criteria associated with the algorithm indicating the feature output is not indicative of the human voice;

determining the presence of the human voice in the frame of audio signal responsive to an aggregation of the results determined for each of the plurality of algorithms indicating the human voice exceeding a decision threshold value, wherein the aggregation is computed by applying a weight to each result determined for each of the plurality of algorithms; and outputting a voice detection signal indicative of the presence of the human voice in the frame of audio signal.

12. The non-transitory computer-readable medium of claim 11, wherein the steps further comprise:

performing a smoothing function on the frame of audio signal to reduce noise to generate smoothed audio signal; and determining a number of zero-crossings in the smoothed audio signal, the zero-crossings comprising changes in the audio signal from a negative value to a positive value or from a positive value to a negative value, wherein the number of zero-crossings is indicative of the human voice if the number of zero-crossings is less than a threshold number of zero-crossings, and wherein the number of zero-crossings is a second feature of the audio signal.

13. The non-transitory computer-readable medium of claim 11, wherein the periodicity metric is indicative of the human voice if the periodicity metric exceeds a threshold periodicity metric.

14. The non-transitory computer-readable medium of claim 11, wherein the steps further comprise:

determining a peak amplitude of the autocorrelation signal.

15. The non-transitory computer-readable medium of claim 11, wherein generating the filtered signal using the frame of the audio signal comprises:

performing a down-sampling of the frame of audio signal to generate a down-sampled frame; and applying a high pass filter to the down-sampled frame of audio signal to generate a filtered signal, the high pass filter configured to remove signals with a frequency lower than a predefined threshold frequency.

16. The non-transitory computer-readable medium of claim 11, wherein the steps further comprise:

identifying a low frequency band and a high frequency band in the frame of audio signal;

computing an energy of the low frequency band and an energy of the high frequency band; and determining an energy ratio of the energy of the low frequency band and the energy of the high frequency band to generate an energy ratio, wherein the energy ratio is indicative of the human voice if the energy ratio is greater than a threshold energy ratio, and wherein the energy ratio is a second feature of the audio signal.

17. The non-transitory computer-readable medium of claim 11, wherein the steps further comprise:

determining an audio envelope estimate by applying a first filter to the frame of audio signal;

determining an audio floor estimate by applying a second filter to the frame of audio signal; and determining an envelope-to-floor ratio of the determined audio envelop estimate to the determined audio floor estimate, wherein the envelope-to-floor ratio is indicative of the human voice if the envelope-to-floor ratio is greater than a threshold envelop-to-floor ratio, and wherein the envelope-to-floor ratio is a second feature of the audio signal.

18. A system comprising:

a processor; and a non-transitory computer-readable medium comprising computer program instructions that when executed by the processor causes the processor to perform steps comprising:

receiving a frame of audio signal of an environment from a client device;

selecting a training data set based on an application of one or more voice detection applications;

determining, using a machine learning model trained using the training data set, a threshold of predefined criteria associated with an algorithm of a plurality of algorithms for determining a presence of a human voice in the frame of audio signal, each of the plurality of algorithms configured to output a feature of the audio signal;

dividing the frame of audio signal into a plurality of sub-frames;

for each of the plurality of sub-frames, determining a local peak in amplitude;

determining a minimum local peak among the plurality of local peaks in amplitude;

generating a filtered signal using the frame of the audio signal;

performing a center clipping on the filtered signal using the minimum local peak as a cut off value;

performing an autocorrelation of the center-clipped filtered signal to generate an autocorrelation signal;

detecting a periodicity metric of the frame of audio signal using the autocorrelation signal, wherein the periodicity metric is a first feature of the audio signal;

determining a result for each of the plurality of algorithms, the result for the algorithm having a first value in response to the feature output by the algorithm indicating the human voice based on a comparison of the feature output to predefined criteria associated with the algorithm indicating the feature output is indicative of the human voice and having a second value in response to the comparison of the feature output to the predefined criteria associated with the algorithm indicating the feature output is not indicative of the human voice;

determining the presence of the human voice in the frame of audio signal responsive to an aggregation of the results determined for each of the plurality of algorithms indicating the human voice exceeding a decision threshold value, wherein the aggregation is computed by applying a weight to each result determined for each of the plurality of algorithms; and outputting a voice detection signal indicative of the presence of the human voice in the frame of audio signal.

19. The system of claim 18, wherein the steps further comprise:

performing a smoothing function on the frame of audio signal to reduce noise to generate smoothed audio signal; and determining a number of zero-crossings in the smoothed audio signal, the zero-crossings comprising changes in the audio signal from a negative value to a positive value or from a positive value to a negative value, wherein the number of zero-crossings is indicative of the human voice if the number of zero-crossings is less than a threshold number of zero-crossings, and wherein the number of zero-crossings is a second feature of the audio signal.

20. The system of claim 18, wherein the periodicity metric is indicative of the human voice if the periodicity metric exceeds a threshold periodicity metric.

* * * * *